United States Patent
Kim et al.

(10) Patent No.: US 10,315,699 B2
(45) Date of Patent: Jun. 11, 2019

(54) UPPER ARM AND SHOCK ABSORBER MOUNTING BRACKET AND VEHICLE FRAME INCLUDING SAME

(71) Applicant: POSCO, Pohang-si, Gyeongsangbuk-do (KR)

(72) Inventors: Jae-Hyun Kim, Incheon (KR); Yeon-Sik Kang, Incheon (KR); Chang-Gyun Jung, Incheon (KR)

(73) Assignee: POSCO, Pohang-si, Gyeonsangbuk-do (KR)

( * ) Notice: Subject to any disclaimer, the term of this patent is extended or adjusted under 35 U.S.C. 154(b) by 0 days.

(21) Appl. No.: 15/521,576

(22) PCT Filed: Oct. 2, 2015

(86) PCT No.: PCT/KR2015/010457
§ 371 (c)(1),
(2) Date: Apr. 24, 2017

(87) PCT Pub. No.: WO2016/068502
PCT Pub. Date: May 6, 2016

(65) Prior Publication Data
US 2017/0313354 A1  Nov. 2, 2017

(30) Foreign Application Priority Data

Oct. 28, 2014  (KR) ........................ 10-2014-0147658

(51) Int. Cl.
*B62D 21/11* (2006.01)
*B62D 27/02* (2006.01)
(Continued)

(52) U.S. Cl.
CPC .............. *B62D 21/11* (2013.01); *B62D 21/02* (2013.01); *B62D 25/088* (2013.01); *B62D 27/02* (2013.01)

(58) Field of Classification Search
CPC ........ B62D 21/11; B62D 27/02; B62D 21/02; B62D 25/088
See application file for complete search history.

(56) References Cited

U.S. PATENT DOCUMENTS

| 2010/0045072 A1 | 2/2010 | Yamada et al. |
| 2010/0194145 A1 | 8/2010 | Akaki et al. |

(Continued)

FOREIGN PATENT DOCUMENTS

| CN | 102781765 A | 11/2012 |
| JP | 2009-143393 A | 7/2009 |

(Continued)

OTHER PUBLICATIONS

International Search Report dated Jan. 7, 2016 issued in International Patent Application No. PCT/KR2015/010457 (with English translation).

(Continued)

*Primary Examiner* — D Glenn Dayoan
*Assistant Examiner* — Melissa A Black
(74) *Attorney, Agent, or Firm* — Morgan, Lewis & Bockius LLP

(57) ABSTRACT

An embodiment of the present invention provides an improved upper arm and shock absorber mounting bracket and a vehicle frame including same, which can reduce the number of components, make assembly convenient, and reduce the number of assembly steps. An upper arm and shock absorber mounting bracket according to an aspect of the present invention comprises: a central supporting portion forming a flat surface portion, on which a shock absorber is supported, by pressing and forming a tube member; side supporting portions formed by being bent downwardly from both sides of the central supporting portion, in which both ends of an upper arm are mounted on the side supporting (Continued)

portions to support the other end of the shock absorber and to be coupled to a wheel; and vehicle mounting portions forming by being bent from the side supporting portions.

9 Claims, 6 Drawing Sheets

(51) Int. Cl.
  *B62D 21/02* (2006.01)
  *B62D 25/08* (2006.01)

(56) References Cited

U.S. PATENT DOCUMENTS

| | | |
|---|---|---|
| 2012/0306234 A1 | 12/2012 | Akaki et al. |
| 2012/0313360 A1 | 12/2012 | Akaki et al. |
| 2016/0068190 A1* | 3/2016 | Muehlhausen ...... B62D 25/088 296/187.01 |

FOREIGN PATENT DOCUMENTS

| | | |
|---|---|---|
| JP | 2009-292226 A | 12/2009 |
| JP | 2010-115933 A | 5/2010 |
| KR | 20-1998-061115 U | 11/1998 |
| KR | 10-0802700 B1 | 2/2008 |
| KR | 10-2012-0007608 U | 11/2012 |
| KR | 10-2014-0013617 A | 2/2014 |
| KR | 10-2014-0031684 A | 3/2014 |

OTHER PUBLICATIONS

Chinese Office Action dated Oct. 24, 2018 issued in Chinese Patent Application No. 201580059358.4 (with English translation).

* cited by examiner

[FIG. 1]
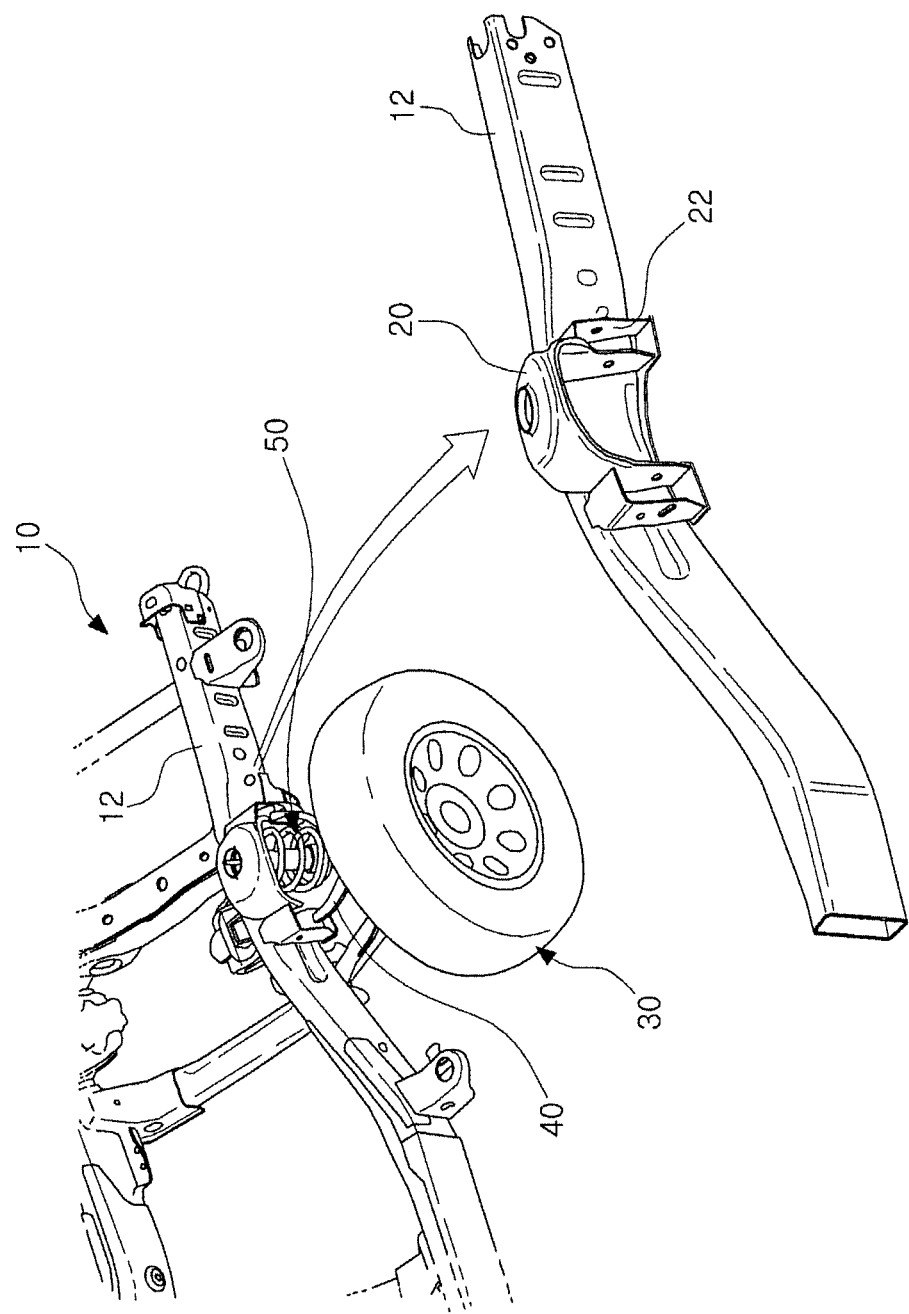

【FIG. 2】
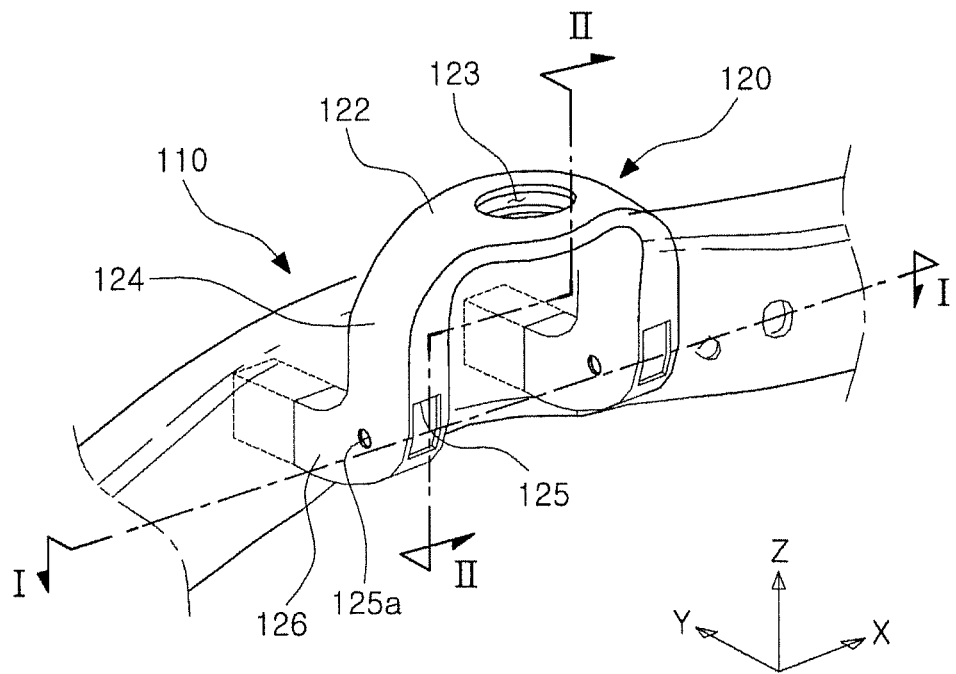
【FIG. 3】
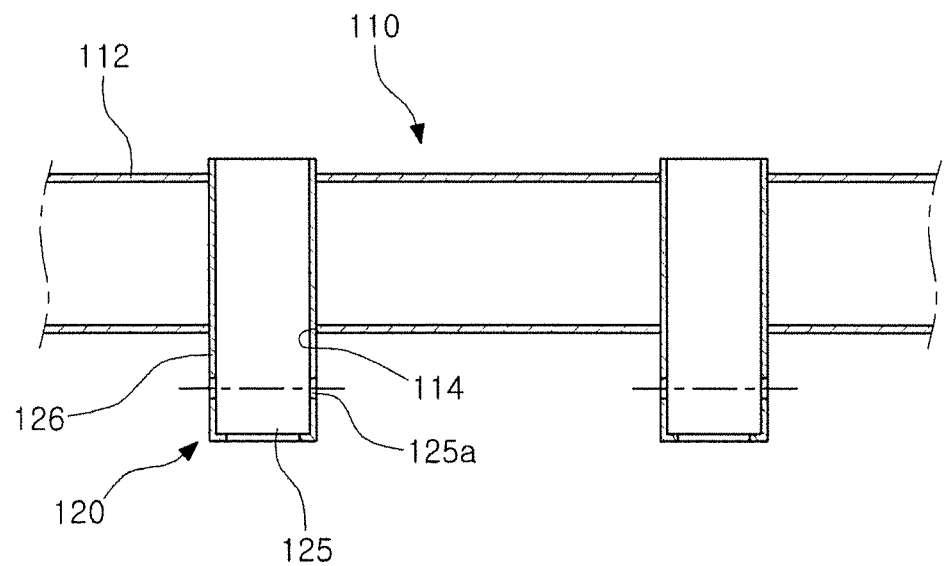

[FIG. 4]
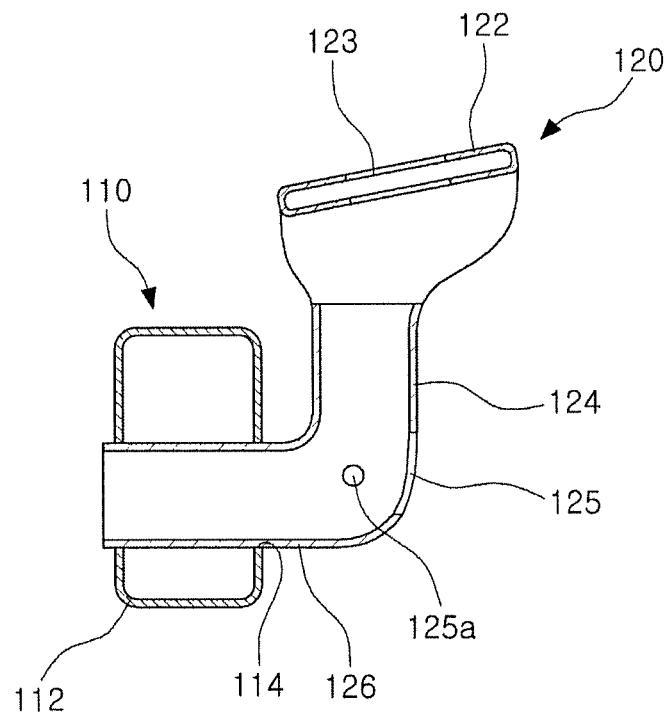

[FIG. 5]
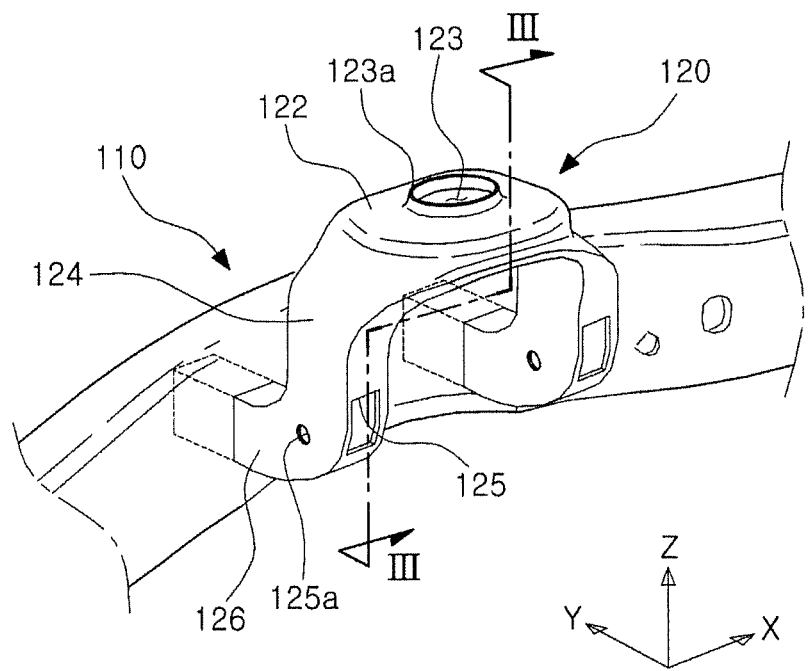

【FIG. 6】
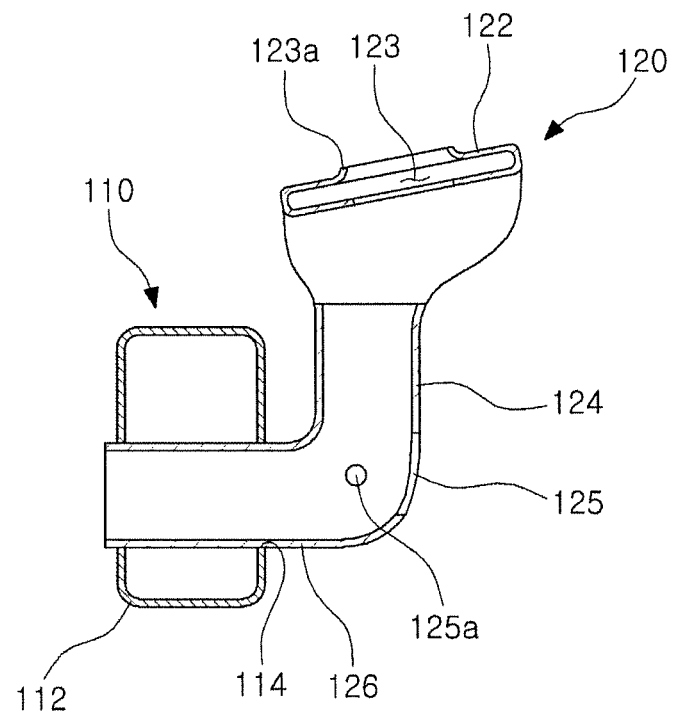
【FIG. 7】
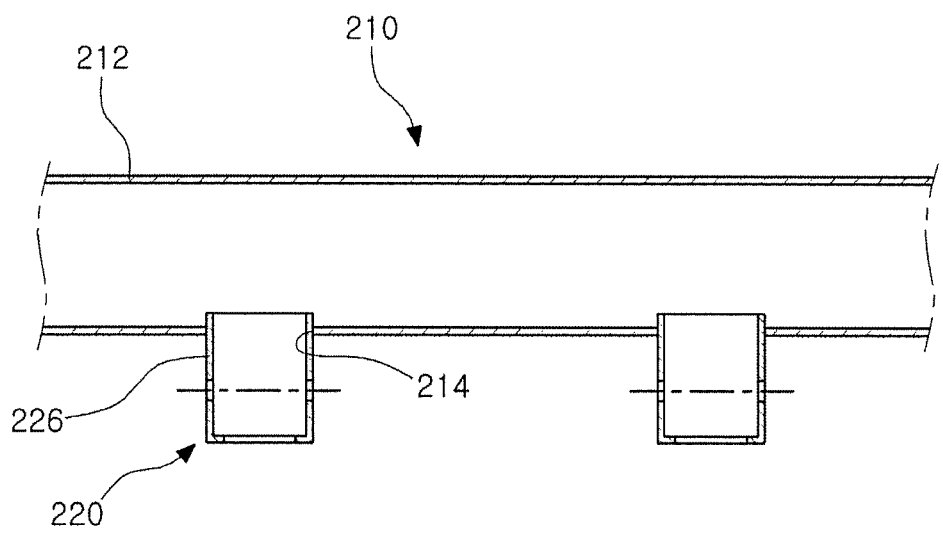

【FIG. 8】
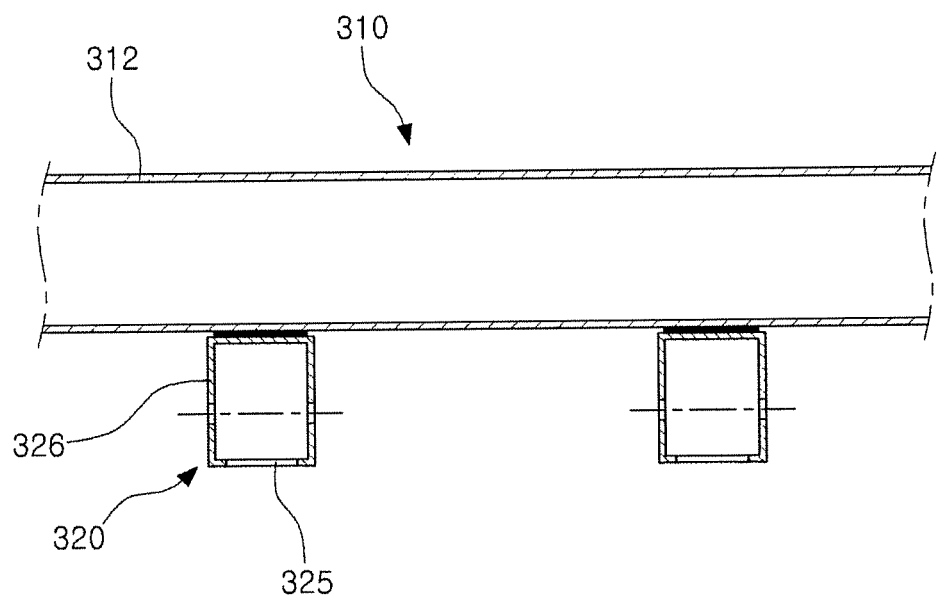
【FIG. 9】
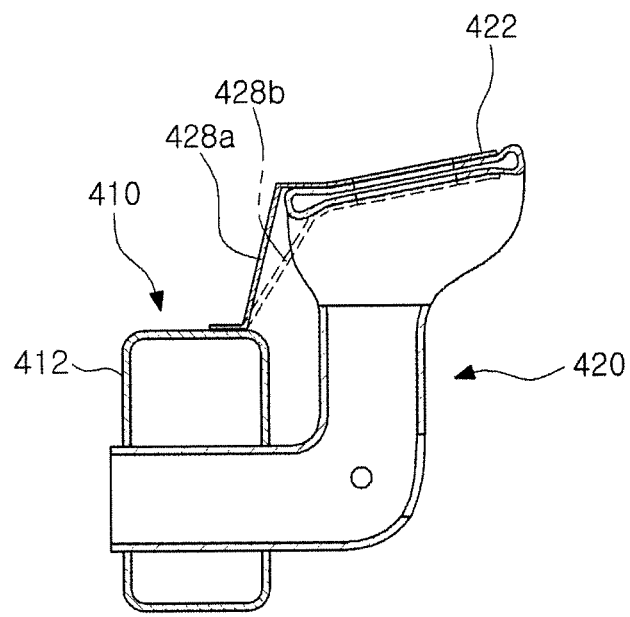

UPPER ARM AND SHOCK ABSORBER MOUNTING BRACKET AND VEHICLE FRAME INCLUDING SAME

CROSS REFERENCE

This patent application is the U.S. National Phase under 35 U.S.C. § 371 of International Application No. PCT/KR2015/010457, filed on Oct. 2, 2015, which claims the benefit of Korean Patent Application No. 10-2014-0147658, filed on Oct. 28, 2014, the entire contents of each are hereby incorporated by reference.

TECHNICAL FIELD

The present disclosure relates to an upper arm and shock absorber mounting bracket and a vehicle frame including the same, and more particularly, to an upper arm and shock absorber mounting bracket, improving a structure in which a shock absorber, an upper arm and the like of a vehicle are mounted, and a vehicle frame including the same.

BACKGROUND ART

In general, a vehicle has a plurality of wheels 30 in contact with the road surface, and these wheels are coupled to a vehicle frame 10 to absorb upward and downward impacts or the like that may occur through contact with the road surface.

As described above, a structure for absorbing impacts on vehicles is applied to the vehicle frame 10. Such a structure is known as suspension.

As an example, with respect to the vehicle frame 10, the wheels 30 are coupled to a frame body portion 12 in a state in which their camber angle is maintained to be upright by an upper arm 40 provided to be rotatable in upward and downward directions. In addition, the vehicle frame 10 is provided with a shock absorber 50 to absorb impacts that may occur when the upper arm 40 comes into contact with the road surface and to prevent vibrations, and the shock absorber 50 is mounted between the upper arm 40 and a shock absorber mounting bracket 20 provided in the frame body portion 12.

For this purpose, the vehicle frame 10 has the frame body portion 12 formed using hydroforming, press forming, or the like, and brackets 20 and 22 for mounting components, such as the shock absorber 50 or the upper arm 40, to the frame body portion 12 are manufactured using bending, punching, pressing, or the like, and then integrally coupled to the frame body portion 12 using welding or the like.

However, as the number of various types of components such as the brackets 20 and 22 increases, the vehicle frame 10 in the related art may incur an increase in costs and time required to assemble these components, and it may also be difficult to mount the components accurately on the vehicle frame 10 due to the interference of many components and also to secure a sufficient degree of strength.

DISCLOSURE

Technical Problem

An aspect of the present disclosure may provide an upper arm and shock absorber mounting bracket, which may reduce the number of required components, may make assembly convenient, and may decrease the number of assembly steps, and a vehicle frame including the same.

Technical Solution

According to an aspect of the present disclosure, an upper arm and shock absorber mounting bracket may include: a central supporting portion forming a flat surface portion, on which a shock absorber is supported, by pressing and forming a tube member; side supporting portions formed by being bent downwardly from both sides of the central supporting portion, in which both ends of an upper arm are mounted on the side supporting portions to support the other end of the shock absorber and to be coupled to a wheel; and vehicle mounting portions formed by being bent from the side supporting portions.

The upper arm and shock absorber mounting bracket may further include a circular groove portion formed in a center of the central supporting portion to allow an end portion of the shock absorber to be seated and accommodated.

Each of the side supporting portions may include: a mounting hole formed to penetrate to allow the upper arm to be inserted into the mounting hole; and a pair of shaft insertion holes formed to be perpendicular to the mounting hole, and allowing a rotary shaft supporting the upper arm, inserted into the mounting hole, to be inserted into the pair of shaft insertion holes, such that the upper arm is rotatable upwardly and downwardly.

The tube member may be formed of twinning induced plasticity (TWIP) steel.

According to an aspect of the present disclosure, a vehicle frame may include: a frame body portion provided to support a lower portion of a vehicle; and the above-mentioned upper arm and shock absorber mounting bracket mounted on one side of the frame body portion.

The frame body portion may include through holes allowing the vehicle mounting portions of the upper arm and shock absorber mounting bracket to be inserted into the through holes and then fixed to the frame body portion, using welding.

The frame body portion may include a quadrangular tube member on at least one side thereof, and the through holes be formed through at least one side surface of the quadrangular tube member.

The upper arm and shock absorber mounting bracket may be fixed to the frame body portion on at least one side surface of the vehicle mounting portions, using welding, so as to be coupled to the frame body portion.

The vehicle frame may further include connection reinforcing members interposed between the frame body portion and the central supporting portion of the upper arm and shock absorber mounting bracket.

Advantageous Effects

According to an embodiment in the present disclosure, functions of a plurality of components may be integrated to reduce the number of required components, accordingly decreasing assembly costs and working hours, and improving stiffness.

DESCRIPTION OF DRAWINGS

FIG. 1 is a perspective view of a vehicle frame according to the related art;

FIG. 2 is a perspective view of a vehicle frame according to an embodiment.

FIG. 3 is a cross-sectional view taken along line I-I of FIG. 2;

FIG. 4 is a cross-sectional view taken along line II-II of FIG. 2;

FIG. 5 is a perspective view of a vehicle frame according to another embodiment;

FIG. 6 is a cross-sectional view taken along line III-III of FIG. 5;

FIG. 7 is a cross-sectional view of a state of coupling between an upper arm and shock absorber mounting bracket and a vehicle frame according to another embodiment;

FIG. 8 is a cross-sectional view of a state of coupling between an upper arm and shock absorber mounting bracket and a vehicle frame according to another embodiment; and FIG. 9 is a cross-sectional view of a state of coupling between an upper arm and shock absorber mounting bracket and a vehicle frame according to another embodiment.

BEST MODE FOR INVENTION

Embodiments in the present disclosure will hereinafter be described in detail with reference to the attached drawings. The disclosure may, however, be exemplified in many different forms and should not be construed as being limited to the specific embodiments set forth herein. For example, the shapes and sizes of components shown in the drawings may be exaggerated for clarity. Elements denoted by the same reference numerals in the drawings are the same.

FIG. 2 is a perspective view of a vehicle frame according to an embodiment. FIG. 3 is a cross-sectional view taken along line I-I of FIG. 2. FIG. 4 is a cross-sectional view taken along line II-II of FIG. 2.

Referring to FIGS. 2 through 4, a vehicle frame 110 according to this embodiment may be provided in a lower portion of a vehicle to support a vehicle body, and may be provided to support wheels in substantially contacting the road surface.

In this embodiment, the vehicle frame 110 may be provided with a suspension system, for example, a suspension, that may absorb upward and downward impacts, or the like, transmitted from the road surface to wheels.

Accordingly, the vehicle frame 110 may include various components for coupling the suspension.

In this embodiment, an upper arm and shock absorber mounting bracket 120 for mounting an upper arm (40 of FIG. 1) and a shock absorber (50 of FIG. 1) used as the suspension, may be coupled to the vehicle frame 10.

The upper arm and shock absorber mounting bracket 120 may be formed by pressing and forming a tube member, and at this time, the tube member may be integrally processed and formed using various methods such as bending, hydroforming, press forming, or the like.

The upper arm and shock absorber mounting bracket 120, may include a central supporting portion 122 forming a flat surface portion, on which a shock absorber is supported, by pressing and forming the tube member as described above, side supporting portions 124 formed by being bent downward from both sides of the central supporting portion 122, and vehicle mounting portions 126 formed by being bent from the side supporting portions 124.

The side supporting portions 124 may have both ends of the upper arm, for coupling to the wheels, mounted thereon. At this time, the upper arm may support the other end of the shock absorber coupled to the central supporting portion 122.

In addition, the central supporting portion 122 may be formed to have a dual structure by compressing the tube member to form the flat surface portion, and a circular burred hole, in which one end of the shock absorber may be compressed and accommodated, may be formed in a center of the flat surface portion to be penetrated up and down. A spring may also be seated on an outer portion of the flat surface portion of the central supporting portion 122.

The side supporting portions 124 may also have mounting holes 125 formed through one side of a lower portion thereof, such that the upper arm may be inserted into the mounting holes 125 in a direction in which the upper arm is mounted. The mounting holes 125 may be formed to have an elongated quadrangular shape, such that the upper arm may move up and down in a state of being inserted into the mounting holes 125.

In addition, each of the side supporting portions 124 may have a pair of shaft insertion holes 125a, in which a rotary shaft may be inserted, formed to rotatably support the upper arm inserted into the mounting holes 125. The shaft insertion holes 125a may be formed in a direction perpendicular to the mounting holes 125, and accordingly, the upper arm may be inserted into the mounting holes 125, and then the rotary shaft supporting the upper arm to be rotated upwardly and downwardly may be inserted into the mounting holes 125.

The tube member, in which a material having excellent formability is used, may be used as the upper arm and shock absorber mounting bracket 120 according to this embodiment, in order to form various shapes such as the flat surface portion or the like. As an example, the tube member may be formed of twinning induced plasticity (TWIP) steel.

The TWIP steel may include, as components, iron (Fe), carbon (C), manganese (Mn), aluminum (Al), and other impurities, and may have an austenite phase structure having an elongation of 45% to 65%. In addition, the TWIP steel may be formed of a high-strength steel, having, for example, a yield stress (YS) of about 500 MPa to about 600 MPa.

This TWIP steel may be steel having greatly improved ductility by relieving stress concentration while forming a symmetrical structure, in which metal atoms are gradually tilted to be mirrored inside the structure of the steel during plastic deformation of the TWIP steel, that is, deformation twinning, and exhibiting high work hardening.

The TWIP steel may also have good formability and a tensile strength of 900 MPa or higher to thus withstand repeated loads introduced to the shock absorber and the upper arm.

Referring to FIGS. 3 and 4, a vehicle frame 110 may include the above-mentioned upper arm and shock absorber mounting bracket 120, and for this purpose, a frame body portion 112 may include through holes 114 for mounting the upper arm and shock absorber mounting bracket 120.

The frame body portion 112 may be provided to support a lower portion of a vehicle, and vehicle mounting portions 126 of the upper arm and shock absorber mounting bracket 120 may be inserted into the through holes 114, formed in the frame body portion 112, through the through holes 114 in one sides of the frame body portion 112.

The upper arm and shock absorber mounting bracket 120 may be integrally fixed, using welding, in a state of being inserted into the through holes 114.

As an example, the frame body portion 112 may include a quadrangular tube member on at least one side thereof, and the through holes 114 may be formed through both side surfaces of the quadrangular tube member positioned in a direction in which the upper arm and shock absorber mounting bracket 120 is inserted into the through holes 114.

The upper arm and shock absorber mounting bracket 120 may be fully inserted into the through holes 114 of the frame body portion 112 to be coupled to the vehicle frame 110, using welding, thereby greatly improving coupling stiffness.

Meanwhile, the central supporting portion 122 is illustrated as being formed to have the shape of a flat surface, but the shape of the central supporting portion 122 is not limited thereto and may be variously modified.

FIG. 5 is a perspective view of a vehicle frame according to another embodiment. FIG. 6 is a cross-sectional view taken along line III-III of FIG. 5.

Referring to FIGS. 5 and 6, the central supporting portion 122 may include a protrusion 123a in which a peripheral portion of a burred hole 123, formed in a center of a flat surface portion, protrudes upwardly, and accordingly, a shock absorber may be seated more stably.

In addition, the central supporting portion 122 may protrude downwardly from an outer circumferential surface of the flat surface portion to surround a portion of a side surface of a spring for seating of the spring.

Meanwhile, in a vehicle frame 110 according to this embodiment, a coupling structure of an upper arm and shock absorber mounting bracket 120 and a frame body portion 112 is not limited, and may be variously modified.

As an example, with reference to FIG. 7, a cross-sectional view of a state of coupling between an upper arm and shock absorber mounting bracket 220 and a vehicle frame 210 according to another embodiment, in the vehicle frame 210, a frame body portion 212 may have through holes 214 formed through only one side surface of a quadrangular tube member positioned in a direction in which the upper arm and shock absorber mounting bracket 220 is inserted into the through holes 214.

In addition, the upper arm and shock absorber mounting bracket 220 may be fixed, using welding or the like, after a vehicle mounting portion 226 is inserted into a single through hole 214 formed in the frame body portion 212.

Such a coupling structure may improve coupling stiffness, as well as reduce the length of vehicle mounting portions 226 of the upper arm and shock absorber mounting bracket 220, thereby enabling the entire use of materials and reducing costs.

FIG. 8 is a cross-sectional view of a state of coupling between an upper arm and shock absorber mounting bracket 320 and a vehicle frame 310 according to another embodiment.

Referring to FIG. 8, the upper arm and shock absorber mounting bracket 320 may be formed by closing or bending an end thereof, and accordingly, a portion of the upper arm and shock absorber mounting bracket 320 contacting a frame body portion 312 may be provided in a closed state.

At least one side surface of the upper arm and shock absorber mounting bracket 320 may be fixed to the frame body portion 312, using welding.

Preferably, in a state in which vehicle mounting portions 326 of the upper arm and shock absorber mounting bracket 320 are disposed to be in contact with the frame body portion 312, ends of the vehicle mounting portions 326, being in surface contact with the frame body portion 312, may be welded using point welding or the like.

At this time, a welding machine for point welding may be inserted into mounting holes 325 to point weld closed surfaces of the vehicle mounting portions 326 to the frame body portion 312.

FIG. 9 is a cross-sectional view of a state of coupling between an upper arm and shock absorber mounting bracket 420 and a vehicle frame 410 according to another embodiment.

Referring to FIG. 9, the vehicle frame 410 may further include connection reinforcing members 428a and 428b for further reinforcing coupling strength of the upper arm and shock absorber mounting bracket 420.

Preferably, the connection reinforcing members 428a and 428b may be welded and coupled to one side of a frame body portion 412 and a central supporting portion 422, for example, at least one of an upper or lower surface of a flat surface portion.

At this time, in the central supporting portion 422, upper and lower surfaces of a tube member may be preferably attached to each other.

While the present disclosure has been shown and described in connection with the embodiments, it will be apparent to those skilled in the art that modifications and variations may be made without departing from the spirit and scope of the present disclosure as defined by the appended claims.

The invention claimed is:

1. An upper arm and shock absorber mounting bracket comprising:
　a central supporting portion forming a flat surface portion, on which a shock absorber is supported, by pressing and forming a tube member;
　side supporting portions formed by being bent downwardly from both sides of the central supporting portion, in which both ends of an upper arm are mounted on the side supporting portions to support the other end of the shock absorber and to be coupled to a wheel; and
　vehicle mounting portions formed by being bent from the side supporting portions,
　wherein each of the side supporting portions comprises:
　a mounting hole formed to penetrate such that the upper arm is inserted into the mounting hole; and
　a pair of shaft insertion holes formed to be perpendicular to the mounting hole, and allowing a rotary shaft supporting the upper arm, inserted into the mounting hole, to be inserted into the pair of shaft insertion holes, such that the upper arm is rotatable upwardly and downwardly.

2. The upper arm and shock absorber mounting bracket of claim 1, further comprising a circular groove portion formed in a center of the central supporting portion to allow an end portion of the shock absorber to be seated and accommodated.

3. The upper arm and shock absorber mounting bracket of claim 1, wherein the tube member is formed of twinning induced plasticity (TWIP) steel.

4. A vehicle frame comprising:
　a frame body portion provided to support a lower portion of a vehicle; and
　the upper arm and shock absorber mounting bracket according to claim 1 mounted on one side of the frame body portion.

5. The vehicle frame of claim 4, wherein the frame body portion comprises through holes allowing the vehicle mounting portions of the upper arm and shock absorber mounting bracket to be inserted into the through holes through through holes and then fixed to the frame body portion, using welding.

6. The vehicle frame of claim 5, wherein the frame body portion comprises a quadrangular tube member on at least one side thereof, and the through holes are formed through at least one side surface of the quadrangular tube member.

7. The vehicle frame of claim 4, wherein the upper arm and shock absorber mounting bracket is fixed to the frame body portion on at least one side surface of the vehicle mounting portions, using welding, so as to be coupled to the frame body portion.

8. The vehicle frame of claim 4, further comprising connection reinforcing members interposed between the frame body portion and the central supporting portion of the upper arm and shock absorber mounting bracket.

9. A vehicle frame comprising:
   a frame body portion provided to support a lower portion of a vehicle; and
   the upper arm and shock absorber mounting bracket according to claim 2 mounted on one side of the frame body portion.

* * * * *